United States Patent
Schmalenberg

(10) Patent No.: US 11,531,105 B2
(45) Date of Patent: Dec. 20, 2022

(54) SYSTEMS AND METHODS FOR REDUCING LIGHT DETECTION AND RANGING (LIDAR) TARGET BROADENING

(71) Applicant: Toyota Motor Engineering & Manufacturing North America, Inc., Plano, TX (US)

(72) Inventor: Paul Donald Schmalenberg, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 446 days.

(21) Appl. No.: 16/778,984

(22) Filed: Jan. 31, 2020

(65) Prior Publication Data

US 2021/0239836 A1 Aug. 5, 2021

(51) Int. Cl.
*G01S 17/42* (2006.01)
*G01S 7/486* (2020.01)
*G01S 17/931* (2020.01)
*G01S 17/89* (2020.01)

(52) U.S. Cl.
CPC ............ *G01S 17/42* (2013.01); *G01S 7/4868* (2013.01); *G01S 17/89* (2013.01); *G01S 17/931* (2020.01)

(58) Field of Classification Search
CPC ...... G01S 17/88; G01S 17/894; G01S 7/4873; G01S 17/931; G01S 17/86; G01S 7/2955
See application file for complete search history.

(56) References Cited

U.S. PATENT DOCUMENTS

| | | | |
|---|---|---|---|
| 10,254,388 B2 | 4/2019 | LaChapelle et al. | |
| 10,317,529 B2 | 6/2019 | Shu et al. | |
| 2017/0234976 A1 | 8/2017 | Grauer et al. | |
| 2018/0284245 A1* | 10/2018 | LaChapelle | G01S 7/4861 |
| 2019/0064331 A1 | 2/2019 | Russell et al. | |
| 2019/0293768 A1 | 9/2019 | Subasingha et al. | |
| 2020/0225332 A1* | 7/2020 | Wagner | G01S 7/4863 |
| 2021/0382147 A1* | 12/2021 | Chen | G01S 17/08 |
| 2022/0113411 A1* | 4/2022 | Solomentsev | G01S 17/10 |

\* cited by examiner

*Primary Examiner* — Mirza F Alam
(74) *Attorney, Agent, or Firm* — Christopher G. Darrow; Darrow Mustafa PC

(57) ABSTRACT

Systems and methods described herein relate to reducing Light Detection and Ranging (LIDAR) target broadening. One embodiment acquires a frame including a plurality of points; identifies a first set of points for which the energy returned to a detector exceeds a predetermined energy threshold; identifies a second set of points adjacent to the first set of points that has a range differing from that of the first set of points by less than a predetermined range threshold; defines, as a border, an outline of the second set of points; iteratively reduces laser power for the first set of points, acquires a new frame, identifies the second set of points, and defines as the border, the outline of the second set of points until the border converges to a stable size; and outputs an estimated size of an object based, at least in part, on the stable size of the border.

20 Claims, 5 Drawing Sheets

SYSTEMS AND METHODS FOR REDUCING LIGHT DETECTION AND RANGING (LIDAR) TARGET BROADENING

TECHNICAL FIELD

The subject matter described herein relates in general to Light Detection and Ranging (LIDAR) systems and, more specifically, to systems and methods for reducing LIDAR target broadening.

BACKGROUND

A Light Detection and Ranging (LIDAR) system detects a target object and measures its distance from the system by emitting a beam of light that is reflected from the target. However, such a light beam is not 100 percent efficient, and small amounts of laser power are broadcast in all directions, not just in the beam direction. Usually, more power is leaked nearer to the beam direction. Under normal circumstances, this power is very small and falls below a detection threshold of the LIDAR detector. However, for highly reflective targets, such as mirrors, reflective road signs, and chrome (e.g., a vehicle bumper), this leakage power can be large enough to be detected even if the highly reflective target is not in line with the main LIDAR beam. In practice, this can cause highly reflective objects to seem much larger than they really are, which may set off false alarms in, for example, autonomous-vehicle systems. This phenomenon of highly reflective objects appearing to be larger than they really are is sometimes called "target broadening."

SUMMARY

An example of a system for reducing Light Detection and Ranging (LIDAR) target broadening is presented herein. The system comprises a LIDAR subsystem including one or more source lasers and a detector, one or more processors, and a memory communicably coupled to the one or more processors. The memory stores an analysis module including instructions that when executed by the one or more processors cause the one or more processors to acquire, at the detector, a frame including a plurality of points. The analysis module also includes instructions to identify, among the plurality of points, a first set of points for which energy returned to the detector exceeds a predetermined energy threshold, wherein the first set of points is reflected from an object. The analysis module also includes instructions to identify, among the plurality of points, a second set of points adjacent to the first set of points, wherein the second set of points has an associated range that differs from a range of the first set of points by less than a predetermined range threshold. The analysis module also includes instructions to define, as a border, an outline of the second set of points. The analysis module also includes instructions to iteratively reduce laser power associated with the first set of points, acquire a new frame, identify the second set of points in the new frame, and define, as the border, the outline of the second set of points in the new frame until the border converges to a stable size. The memory also stores an output module including instructions that when executed by the one or more processors cause the one or more processors to output an estimated size of the object based, at least in part, on the stable size of the border.

Another embodiment is a non-transitory computer-readable medium for reducing Light Detection and Ranging (LIDAR) target broadening and storing instructions that when executed by one or more processors cause the one or more processors to acquire, at a LIDAR detector, a frame including a plurality of points. The instructions also cause the one or more processors to identify, among the plurality of points, a first set of points for which energy returned to the LIDAR detector exceeds a predetermined energy threshold, wherein the first set of points is reflected from an object. The instructions also cause the one or more processors to identify, among the plurality of points, a second set of points adjacent to the first set of points, wherein the second set of points has an associated range that differs from a range of the first set of points by less than a predetermined range threshold. The instructions also cause the one or more processors to define, as a border, an outline of the second set of points. The instructions also cause the one or more processors to iteratively reduce laser power associated with the first set of points, acquire a new frame, identify the second set of points in the new frame, and define, as the border, the outline of the second set of points in the new frame until the border converges to a stable size. The instructions also cause the one or more processors to output an estimated size of the object based, at least in part, on the stable size of the border.

Another embodiment is a method of reducing Light Detection and Ranging (LIDAR) target broadening, the method comprising acquiring, at a LIDAR detector, a frame including a plurality of points. The method also includes identifying, among the plurality of points, a first set of points for which energy returned to the LIDAR detector exceeds a predetermined energy threshold, wherein the first set of points is reflected from an object. The method also includes identifying, among the plurality of points, a second set of points adjacent to the first set of points, wherein the second set of points has an associated range that differs from a range of the first set of points by less than a predetermined range threshold. The method also includes defining, as a border, an outline of the second set of points. The method also includes iteratively reducing laser power associated with the first set of points, acquiring a new frame, identifying the second set of points in the new frame, and defining as the border, the outline of the second set of points in the new frame until the border converges to a stable size. The method also includes outputting an estimated size of the object based, at least in part, on the stable size of the border.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
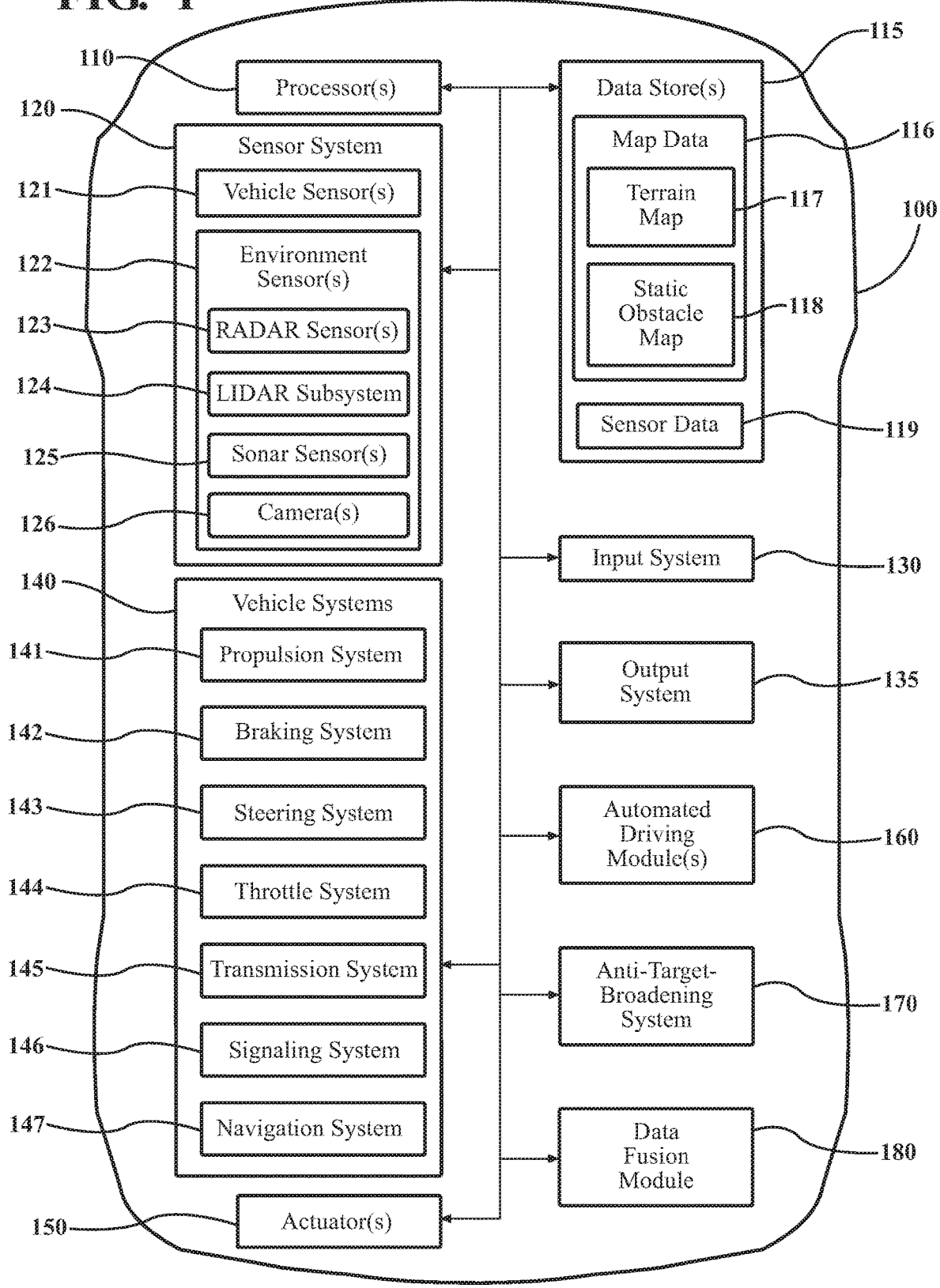
FIG. 1 illustrates one embodiment of a vehicle within which systems and methods disclosed herein may be implemented.

The embodiments described herein reduce target broadening in a Light Detection and Ranging (LIDAR) system through adaptive, iterative techniques. These embodiments have wide application, including to LIDAR systems deployed in vehicles (e.g., autonomous vehicles). In an acquired frame of LIDAR data that includes a plurality of points, the system identifies a first set of points for which the energy returned to the LIDAR detector exceeds a predetermined energy threshold. In some embodiments, the energy associated with the first set of points corresponds to saturation of the detector. In other embodiments, the first set of points, though exceeding the predetermined energy threshold, has an associated energy that falls below the level of saturation. Identifying this first set of points may indicate the presence of a highly reflective object in the frame. Such an object can have target broadening associated with it.

The system also identifies, among the plurality of points, a second set of points adjacent to the first set of points. In some embodiments, the second set of points might be termed "fringe points," since they lie outside the outline of the object from which the first set of points are reflected. In some embodiments, segmentation techniques are used to ascertain the boundaries between the first set of points and the second set of points. In one embodiment, the second set of points has an associated range (distance from the detector) that differs from the range of the first set of points by less than a predetermined range threshold. The system can define, as a border, the outline (outer extent) of the second set of points.

Once the system has identified the first and second sets of points and has defined the border outlining the second set of points, an iterative aspect of the embodiments described herein commences. During the iterative aspect, the system reduces the laser power associated with the first set of points (the points with high received energy) and acquires a new frame. In the new frame, the system again identifies the second set of points and defines the border as the outline of those points. Due to the reduction of laser power, the size of the region enclosed by the border will have grown somewhat smaller compared with the original border defined for the first frame. That is, the border will have collapsed inward somewhat toward the centroid of the object from which the first set of points was reflected. These actions (reducing laser power, acquiring a new frame, identifying the second set of points, and defining the border around the second set of points) are repeated until the border converges to a stable size (i.e., until the border stops changing in size). The system can then output an estimated size of the object based, at least in part, on the stable size to which the border has converged.

In some embodiments, a data fusion module of a vehicle equipped with a LIDAR subsystem uses the output of the embodiments described herein in performing object detection and tracking. In such embodiments, the system, in analyzing a frame subsequently output to the data fusion module, can flag the first set of points as having low confidence. Also, when the iterative process to reduce target broadening is complete, the system can inform the data fusion module that a set of laser beams corresponding to the first set of points has a reduced range for detecting objects due to the reduction of power that has taken place during the iterative process summarized above.

Referring to FIG. 1, an example of a vehicle 100 is illustrated. Such a vehicle 100 is one possible environment in which various embodiments of an anti-target-broadening system can be deployed. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

The vehicle 100 includes an anti-target-broadening system 170 that is implemented to perform methods and other functions as disclosed herein relating to reducing LIDAR target broadening. Vehicle 100 is merely one example of an environment in which various embodiments of an anti-target-broadening system can be deployed. In some embodiments, a system such as anti-target-broadening system 170 can be deployed in an environment other than a vehicle. Among various environment sensors 122, vehicle 100 includes a LIDAR subsystem 124. Vehicle 100, in this embodiment, also includes a data fusion module 180 that receives the data output by anti-target-broadening system 170, fuses it with multiple previous scans and/or other sensor data from sensor system 120 (including confidence estimates associated with individual points in a point cloud), and segments the sensor data to identify objects in a scene such as "vehicle," "road sign," "building," "tree," etc. In some embodiments, this is accomplished via Bayesian weighting and/or machine learning.

Figure 2:
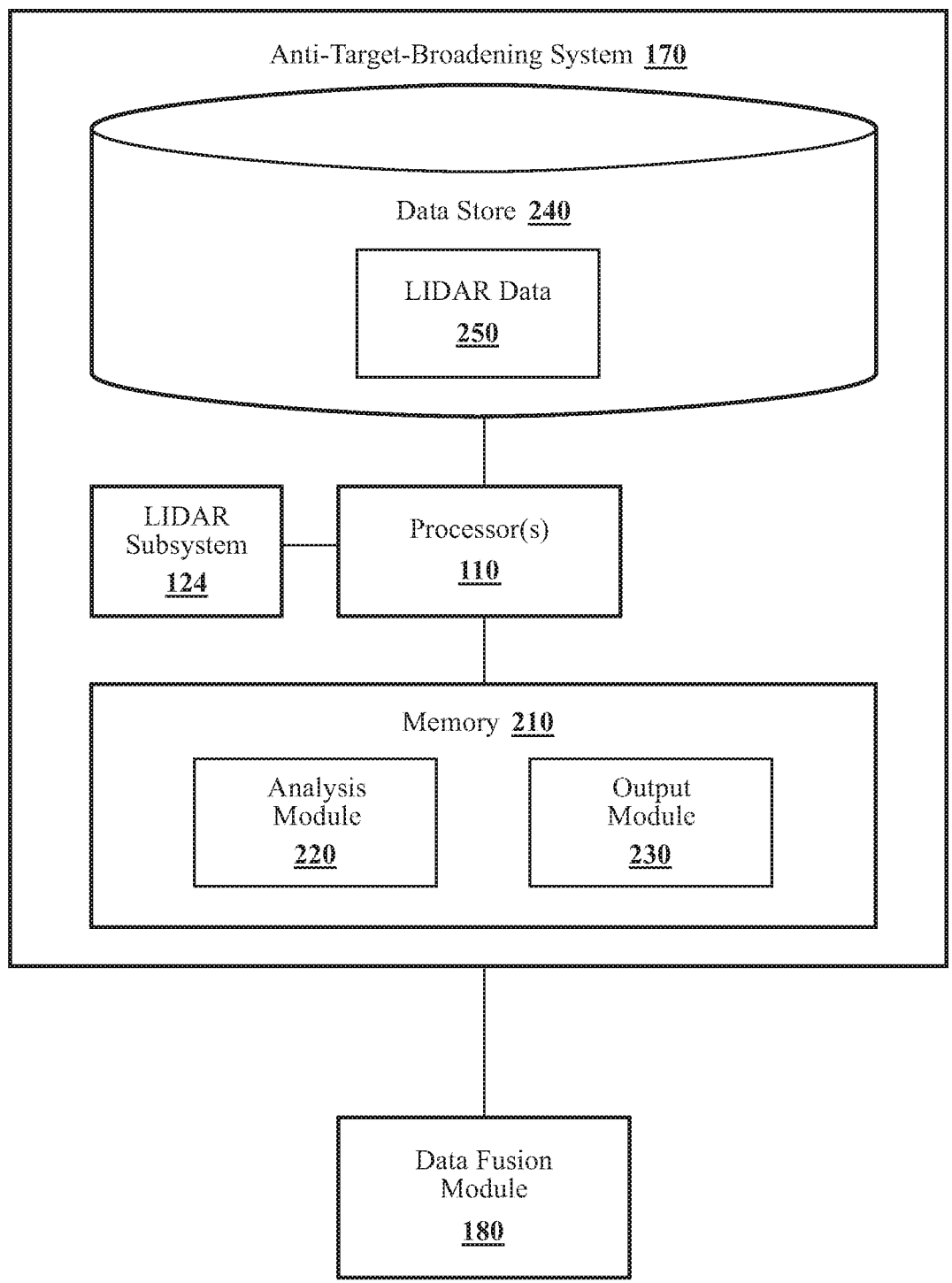
FIG. 2 illustrates one embodiment of an anti-target-broadening system.

With reference to FIG. 2, one embodiment of the anti-target-broadening system 170 of FIG. 1 is further illustrated. The anti-target-broadening system 170 is shown as including one or more processors 110 from the vehicle 100 of FIG.

1. Accordingly, the one or more processors 110 may be a part of the anti-target-broadening system 170, the anti-target-broadening system 170 may include one or more separate processors from the one or more processors 110 of the vehicle 100, or the anti-target-broadening system 170 may access the one or more processors 110 through a data bus or another communication path, depending on the embodiment. In one embodiment, the anti-target-broadening system 170 includes a memory 210 that stores an analysis module 220 and an output module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the one or more processors 110, cause the one or more processors 110 to perform the various functions disclosed herein.

In connection with analyzing point-cloud data from LIDAR subsystem 124, anti-target-broadening system 170 can store LIDAR data 250 in database 240. LIDAR data 250 can include metadata regarding specific points in frames of point-cloud data. Examples of such metadata include the identity of the first and second sets of points and the border outlining the second set of points discussed above. Other examples of metadata include a confidence level associated with a given point in a frame and information about the range associated with specific laser beams in LIDAR subsystem 124 whose power has been reduced during the iterative aspect discussed above. In the embodiment shown in FIG. 2, anti-target-broadening system 170 can communicate with data fusion module 180, outputting frames of LIDAR data in which the effect of target broadening has been reduced to support object detection and tracking processes used by autonomous driving module(s) 160 of vehicle 100 (refer to FIG. 1).

Figure 3:
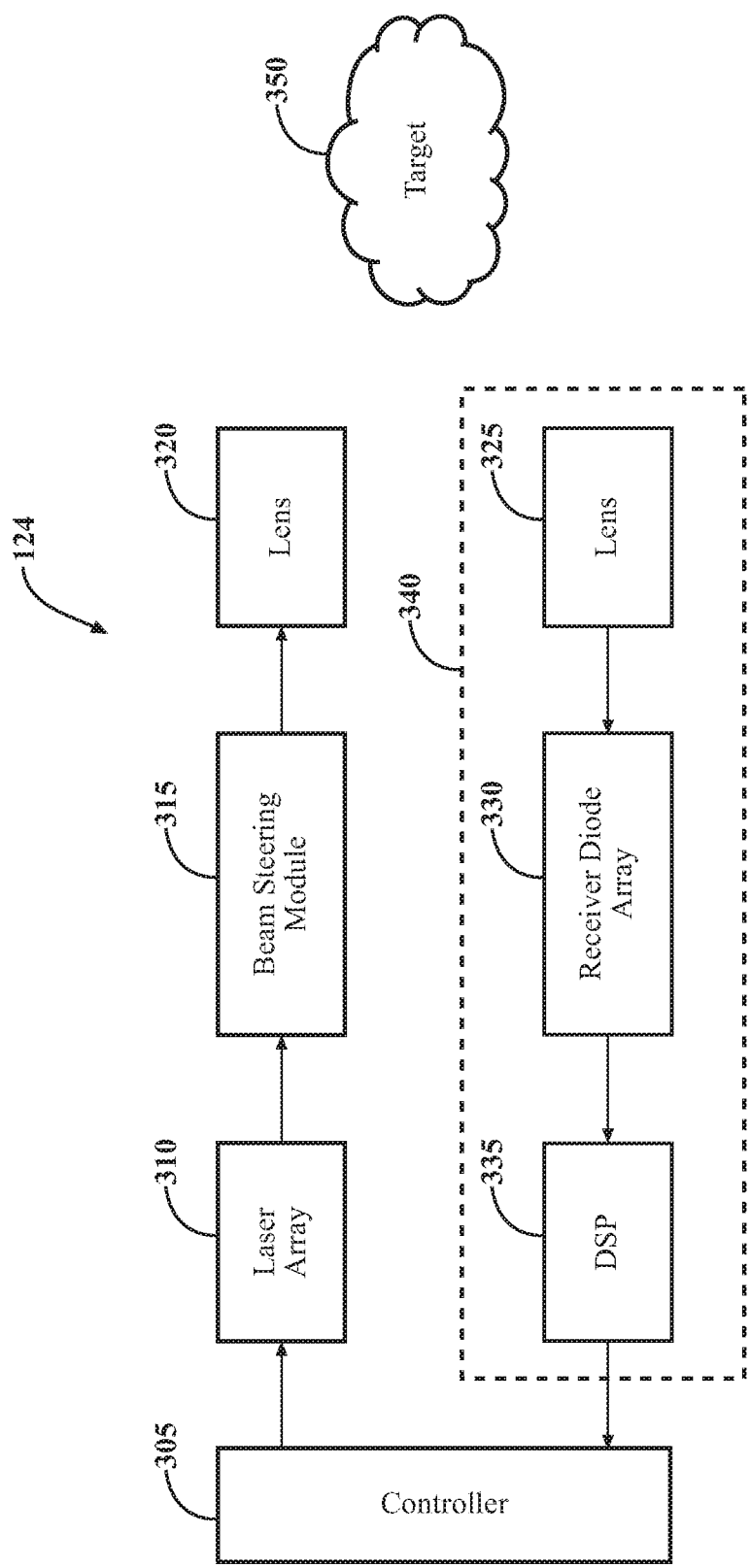
FIG. 3 illustrates one embodiment of a Light Detection and Ranging (LIDAR) subsystem.

FIG. 3 illustrates one embodiment of a LIDAR subsystem 124. LIDAR subsystem 124 includes a controller 305 to coordinate and control the operation of the source and detector. Laser array 310, beam steering module 315, and lens 320 constitute the source portion of LIDAR subsystem 124. The source directs laser beams from laser array 310 toward a target 350 (e.g., an object in a scene). The detector 340 includes a lens 325, a receiver diode array 330, and a digital signal processor (DSP) 335.

FIG. 3 illustrates one possible type of LIDAR subsystem 124, namely a phased-array LIDAR subsystem. In other embodiments, a micro-electro-mechanical systems (MEMS) mirror LIDAR subsystem can be employed. In general, the various embodiments described herein can be implemented using a scanning LIDAR subsystem or a flash LIDAR subsystem. One advantage of a scanning LIDAR subsystem is that the power of individual beams (e.g., those specifically associated with the first set of points discussed above) can be adjusted. The various embodiments described herein can be implemented using mechanical or solid-state LIDAR systems. With a mechanical system, a new frame can be acquired each time the mechanical apparatus completes a rotation. With solid-state feedback-controlled systems such as MEMS-mirror and phased-array systems, the timing of data acquisition can be more flexible, and each point in a region of interest (ROI) is dynamically addressable, providing greater flexibility in the subset of points on which the analysis focuses from frame to frame. With a scanning LIDAR subsystem, anti-target-broadening system 170 can "lock in" on an area of a scene (e.g., a highly reflective object such as a road sign) and clear it up (reduce the target-broadening effect) relatively quickly using the techniques described herein.

Referring again to FIG. 2, analysis module 220 generally includes instructions that cause the one or more processors 110 to analyze point-cloud data to identify potential highly reflective objects for which target broadening can be reduced through an iterative process in which the laser power associated with identified high-energy points (the first set of points discussed above) is reduced from frame to frame until one or more convergence criteria are satisfied. In one embodiment, convergence of the iterative process occurs when the size of a border outlining a second set of identified points (e.g., fringe points outside the outline of a highly reflective object) converges to a stable size. Other embodiments are possible, for example, in which convergence of the iterative process is dependent on the laser power associated with the first set of points (the identified high-energy points) being reduced until the returned energy associated with the first set of points no longer exceeds a predetermined energy threshold (in some embodiments, until the first set of points is no longer saturated). In those embodiments, the returned energy of the first set of points is re-measured during each iteration.

Analysis module 220 acquires, at the detector 340, a frame including a plurality of points. Among the plurality of points, analysis module 220 identifies a first set of points. The first set of points includes points for which the energy returned to the detector 340 exceeds a predetermined energy threshold. As mentioned above, in some embodiments, the energy associated with the first set of points corresponds to saturation of the detector 340. In other embodiments, the first set of points, though exceeding the predetermined energy threshold, has an associated energy that falls below the level of saturation. The predetermined energy threshold can be adjusted empirically as needed, in a practical implementation. Points whose received energy exceeds the predetermined energy threshold might, for example, be reflected from a highly reflective object such as a mirror, shiny metallic object (e.g., a chrome vehicle bumper), or a road sign. In some embodiments, analysis module 220 identifies, for a data fusion module 180 of vehicle 100, the first set of points as having a low confidence level. In other words, analysis module 220 identifies, for downstream algorithms, that there is something unusual about the first set of points (i.e., the high level of received energy at detector 340) so the downstream algorithms can interpret the first set of points more cautiously. Analysis module 220 can inform data fusion module 180 of the lower confidence associated with the first set of points by flagging those points with metadata before a frame of acquired point-cloud data is output to data fusion module 180 by output module 230.

Analysis module 220 also identifies, among the plurality of points, a second set of points that are adjacent to the first set of points. The second set of points includes points having an associated range (distance from the detector 340) that differs from the range of the first set of points by less than a predetermined range threshold. That is, the second set of points is approximately at the same range as the first set of points. As mentioned above, in some embodiments, analysis module 220 can employ segmentation techniques to ascertain the regions occupied by the first and second sets of points.

Once analysis module 220 has identified the second set of points, analysis module 220 defines the outline of the second set of points as a border. Analysis module 220 then proceeds with the iterative aspect of anti-target-broadening system 170. As discussed above, this involves reducing the laser power associated with the first set of points, acquiring a new frame from detector 340, identifying the second set of points in the new frame, defining the outline of the second set of points as the border, and repeating these tasks until the border around the second set of points converges to a stable size. As the laser power associated with the first set of points is reduced at each iteration, the size of the border shrinks inward toward the centroid of the target object. In addition to providing an estimate of the actual size of a target object, another benefit of the border converging to a stable size is that an object detection and tracking system of vehicle 100 can detect what is behind the object outside of its outline (the area that was previously blocked by the fringe points due to excess returned energy associated with the first set of points).

When the power is reduced sufficiently, the size of the border stops changing. At that point, convergence of the iterative process occurs. The size of the border, upon convergence, is referred to herein as the "stable size of the border." In some embodiments, once the border has converged to the stable size, analysis module 220 identifies, for data fusion module 180 of vehicle 100, the set of laser beams corresponding to the first set of points as having a reduced range for object detection due to their reduced power. For example, analysis module 220 can inform data fusion module 180 of the reduced range associated with the first set of points by flagging those points with metadata before a frame of acquired point-cloud data is output to data fusion module 180 by output module 230.

As mentioned above, in other embodiments, convergence of the iterative aspect of anti-target-broadening system 170 can be based on different criteria, such as the returned energy associated with the first set of points no longer exceeding the predetermined energy threshold (in some embodiments, this might mean that the points in the first set of points are no longer saturated).

Various strategies for reducing the laser power associated with the first set of points can be used, depending on the particular embodiment. In one embodiment, the power is reduced at each iteration by a predetermined amount or percentage (not necessarily the same at each iteration) until convergence of the border is achieved. In other embodiments, a bracketing strategy can be employed to maximize the laser power associated with the first set of points while still achieving convergence of the size of the border. Maximizing the laser power under that constraint improves the range for object detection and tracking for the laser beams associated with the first set of points. A specific strategy for power reduction can be devised empirically under real-world conditions.

Figure 4A:
FIG. 4A illustrates a target scene, in accordance with an illustrative embodiment of the invention.

FIG. 4A illustrates a target scene, in accordance with an illustrative embodiment of the invention. FIG. 4A shows one example of an object—a road sign 410—that can be highly reflective, leading to the target-broadening phenomenon discussed above.

Figure 4B:
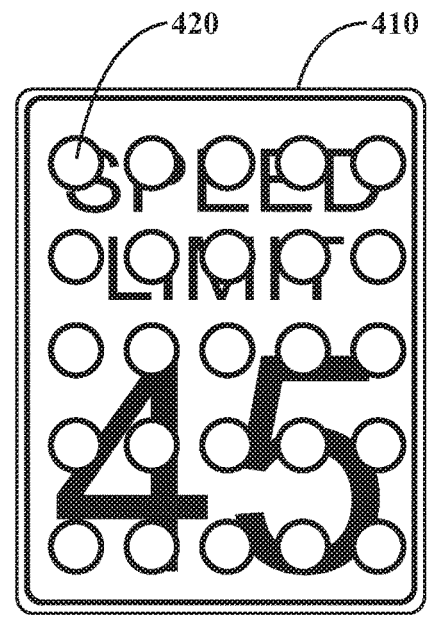
FIG. 4B illustrates a target scene with an ideal LIDAR response, in accordance with an illustrative embodiment of the invention.

FIG. 4B illustrates a target scene with an ideal LIDAR response, in accordance with an illustrative embodiment of the invention. This target scene is the same as that shown in FIG. 4A, but here the target scene has been scanned by LIDAR subsystem 124. In the ideal scenario depicted in FIG. 4B, there is no target broadening associated with the points 420.

Figure 4C:
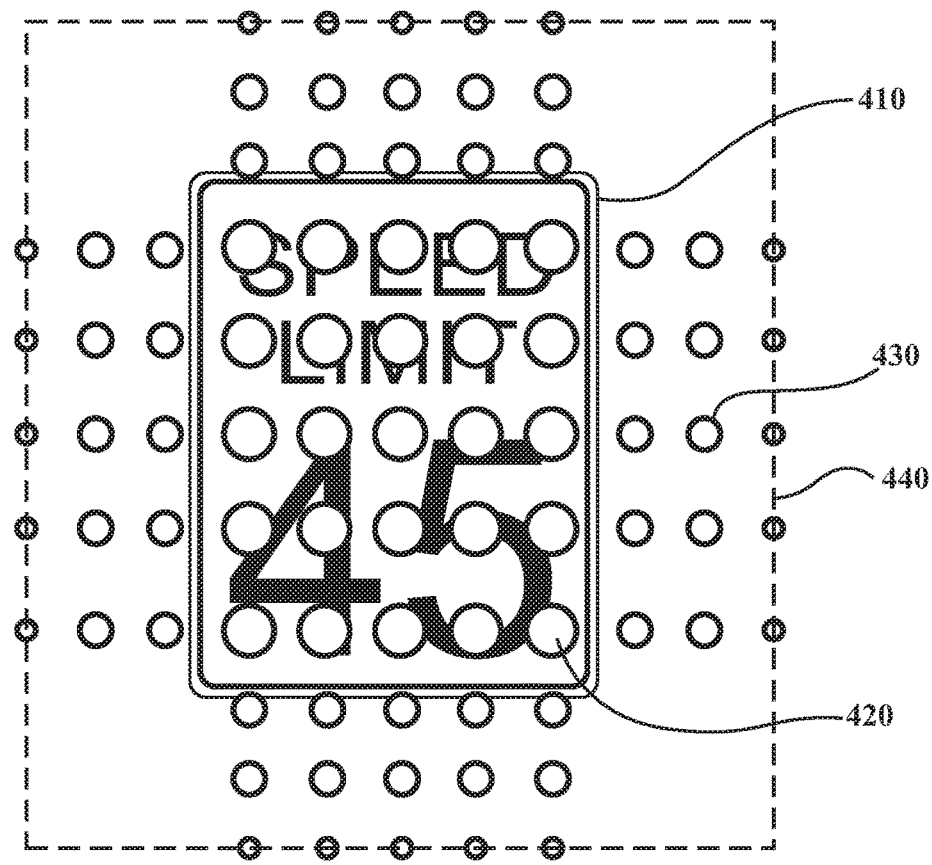
FIG. 4C illustrates a target scene with a more realistic LIDAR response, in accordance with an illustrative embodiment of the invention.

FIG. 4C illustrates a target scene with a more realistic LIDAR response, in accordance with an illustrative embodiment of the invention. In FIG. 4C, LIDAR subsystem 124 receives an abnormally high level of energy from the points 420 making up the first set of points, as discussed above. The energy of those points 420 exceeds the predetermined energy threshold, and they might, in some situations, be saturated. In this realistic scenario, there are also a number of other points 430 that, though they lie outside the outline of road sign 410, have approximately the same range as the first set of points (points 420). This is an example of the target-broadening phenomenon discussed above, which can cause an object-detection system to conclude that the road sign 410 is much larger than it actually is. In one embodiment, the points in the second set of points are identified by comparing the range (distance from LIDAR subsystem 124) of points 430 with the range of the points 420. Points 430 that differ in range by less than a predetermined range threshold are identified as belonging to the second set of points. As shown in FIG. 4C, a border 440 can be defined around the outline of the points identified as the second set of points. This is the border that shrinks in size (collapsing toward the centroid of road sign 410) as the power associated with points 420 (the first set of points) is reduced in connection with the iterative aspect of anti-target-broadening system 170. For round or irregularly shaped objects, the same outlining technique discussed above can be used. As mentioned above, in addition to providing an estimate of the actual size of a target object 410, another benefit of the border 440 converging to a stable size is that an object detection and tracking system of vehicle 100 can detect what is behind the object 410 outside of its outline (this is the area that was previously blocked by the points 430 due to excess returned energy associated with the points 420).

Referring again to FIG. 2, output module 230 generally includes instructions that cause the one or more processors 110 to output an estimated size of the object based, at least in part, on the stable size of the border. In some embodiments, the estimated size of the target object is simply the stable size of the border itself. In other embodiments, the estimated size of the object is instead the outline (outer extent) of the first set of points. In still other embodiments, the estimated size of the object is calculated as a combination (e.g., an average) of the stable size of the border and the outline of the first set of points.

In general, output module 230 outputs the estimated size of the object to other algorithms that perform object detection and/or tracking. For example, in some embodiments, output module 230 outputs the estimated size of the object to a data fusion module 180 of vehicle 100, as discussed above. Output module 230 also outputs frames of acquired LIDAR point-cloud data (see LIDAR data 250 in FIG. 2) to downstream algorithms and systems such as data fusion module 180. As discussed above in connection with analysis module 220, in some embodiments, the output frames of LIDAR data 250 can have associated metadata flagging the first set of points as having a low confidence level, and/or the first set of points can have associated metadata flagging the laser beams corresponding to those points, once power to those laser beams has been reduced and the border 440 has converged to the stable size, as having reduced range for object detection.

Figure 5:
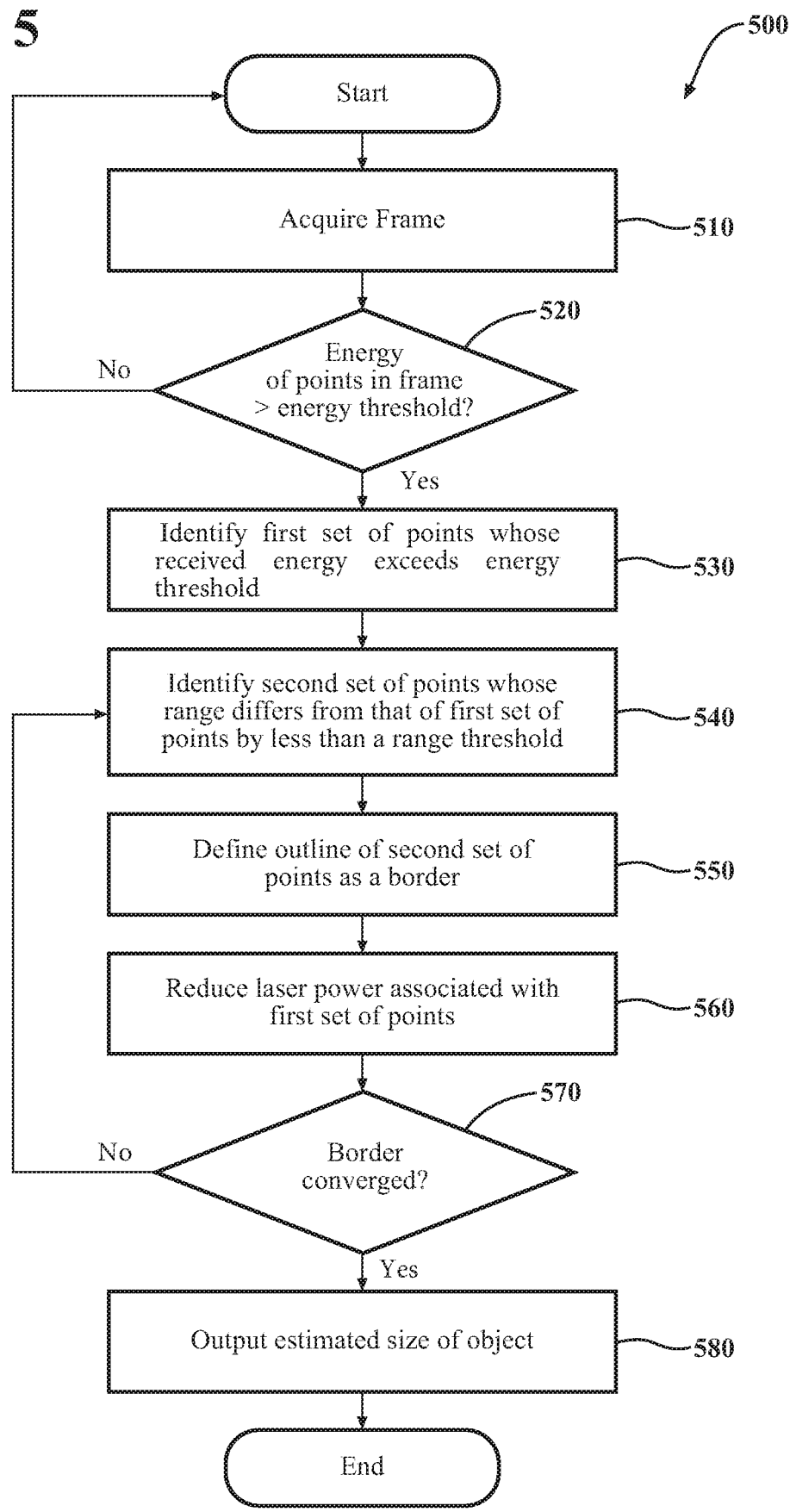
FIG. 5 is a flowchart of a method for reducing LIDAR target broadening, in accordance with an illustrative embodiment of the invention.

FIG. 5 is a flowchart of a method for reducing LIDAR target broadening, in accordance with an illustrative embodiment of the invention. Method 500 will be discussed from the perspective of anti-target-broadening system 170 in FIG. 2. While method 500 is discussed in combination with anti-target-broadening system 170, it should be appreciated that method 500 is not limited to being implemented within anti-target-broadening system 170, but anti-target-broadening system 170 is instead one example of a system that may implement method 500.

At block 510, analysis module 220 acquires a frame of LIDAR data 250 (e.g., point-cloud data) via LIDAR subsystem 124 of vehicle 100. As discussed above, LIDAR subsystem 124 can be any of a variety of different types, including, without limitation, a scanning system, a flash system, a mechanical system, a solid-state system, MEMS-mirror system, phased-array system, etc.

At block 520, if analysis module 220 determines that there are points in the acquired frame for which the received energy at detector 340 exceeds a predetermined energy threshold, control proceeds to block 530.

At block 530, analysis module 220 identifies, among the plurality of points in the frame, a first set of points (see points 420 in FIG. 4C) for which the energy returned to the detector 340 exceeds the predetermined energy threshold. As discussed above, exceeding the predetermined energy threshold can correspond to saturation, in some embodiments. In other embodiments, the first set of points can have an energy level that falls short of saturation but nevertheless exceeds the predetermined energy threshold.

At block 540, analysis module 220 identifies, among the plurality of points in the frame, a second set of points adjacent to the first set of points (see points 430 in FIG. 4C). As discussed above, in some embodiments, the second set of points has an associated range that differs from the range of the first set of points by less than a predetermined range threshold. This operation identifies fringe points that are approximately at the same range as that of the first set of points but that lie outside the outline of the object reflecting the first set of points (see, e.g., road sign 410 in FIGS. 4A-4C).

At block 550, analysis module 220 defines, as a border 440, the outline of the second set of points (refer to the discussion of FIG. 4C above). At block 560, analysis module 220 reduces the laser power associated with the first set of points. As discussed above, the strategy for reducing laser power can differ from embodiment to embodiment. In one embodiment, the power is reduced at each iteration by a predetermined amount or percentage (not necessarily the same at each iteration) until convergence of the border 440 is achieved. In other embodiments, a bracketing strategy can be employed to maximize the laser power associated with the first set of points while still achieving convergence of the size of the border to estimate the size of the object.

If the size of the border 440 has converged to a stable size at block 570, control proceeds to block 580. Otherwise, control returns to block 540. Note that, during this iterative phase of method 500, block 540 includes the action of acquiring a new frame of LIDAR data 250 via LIDAR subsystem 124. Once the new frame of data has been acquired, analysis module 220 can again identify the first and second sets of points in the new frame and redefine the border 440.

At block 580, the border 440 has converged to a stable size (see discussion of block 570 above), and output module 230 outputs the estimated size of the target object based, at least in part, on the size of the border 440. As discussed above, in some embodiments, the estimated size of the target object is simply the stable size of the border 440 itself. In other embodiments, the estimated size of the object is instead the outline (outer extent) of the first set of points. In still other embodiments, the estimated size of the object is calculated as a combination (e.g., an average) of the stable size of the border and the outline of the first set of points.

In some embodiments, method 500 can include additional actions not included in the flowchart of FIG. 5. As discussed above, in some embodiments, the frames of LIDAR data 250 output by output module 230 can have associated metadata flagging the first set of points as having a low confidence level, and/or the first set of points can have associated metadata flagging the laser beams corresponding to those points, once power to those laser beams has been reduced and the border 440 has converged to the stable size, as having reduced range for object detection. Either type of metadata just mentioned can be added by analysis module 220 as the LIDAR data 250 is being analyzed.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s)

110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the anti-target-broadening system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the anti-target-broadening system 170, and/or the autonomous driving module(s) 160 may control some or all of these vehicle systems 140 and, thus, may be partially or fully autonomous.

The processor(s) 110, the anti-target-broadening system 170, and/or the autonomous driving module(s) 160 can be operably connected to communicate with the various vehicle systems 140 and/or individual components thereof. For example, returning to FIG. 1, the processor(s) 110, the anti-target-broadening system 170, and/or the autonomous driving module(s) 160 can be in communication to send and/or receive information from the various vehicle systems 140 to control the movement, speed, maneuvering, heading, direction, etc. of the vehicle 100. The processor(s) 110, the anti-target-broadening system 170, and/or the autonomous driving module(s) 160 may control some or all of these vehicle systems 140.

The processor(s) 110, the anti-target-broadening system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the anti-target-broadening system 170, and/or the autonomous driving module(s) 160 can control the direction and/or speed of the vehicle 100. The processor(s) 110, the anti-target-broadening system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the anti-target-broadening system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for reducing Light Detection and Ranging (LIDAR) target broadening, the system comprising:
   a LIDAR subsystem including one or more source lasers and a detector;
   one or more processors; and
   a memory communicably coupled to the one or more processors and storing:
   an analysis module including instructions executed by the one or more processors that cause the one or more processors to:
      acquire, at the detector, a frame including a plurality of points;
      identify, among the plurality of points, a first set of points for which energy returned to the detector exceeds a predetermined energy threshold, wherein the first set of points is reflected from an object; and
      identify, among the plurality of points, a second set of points adjacent to the first set of points, wherein the second set of points has an associated range that differs from a range of the first set of points by less than a predetermined range threshold;
      define, as a border, an outline of the second set of points; and
      iteratively reduce laser power associated with the first set of points, acquire a new frame, identify the second set of points in the new frame, and define, as the border, the outline of the second set of points in the new frame to cause the border to converge to a stable size; and
   an output module including instructions executed by the one or more processors that cause the one or more processors to output an estimated size of the object based, at least in part, on the stable size of the border.

2. The system of claim 1, wherein the system is integrated with a vehicle.

3. The system of claim 2, wherein the analysis module includes further instructions that when executed by the one or more processors cause the one or more processors to identify, for a data fusion module of the vehicle, the first set of points as having low confidence.

4. The system of claim 2, wherein the analysis module includes further instructions that when executed by the one or more processors cause the one or more processors, after the border has converged to the stable size, to identify, for a data fusion module of the vehicle, a set of laser beams corresponding to the first set of points as having a reduced range.

5. The system of claim 2, wherein the vehicle is an autonomous vehicle.

6. The system of claim 1, wherein the energy returned to the detector corresponds to saturation for at least one point in the first set of points.

7. The system of claim 1, wherein the second set of points includes one or more fringe points lying outside of an outline of the object.

8. A non-transitory computer-readable medium for reducing Light Detection and Ranging (LIDAR) target broadening and storing instructions executed by one or more processors that cause the one or more processors to:
   acquire, at a LIDAR detector, a frame including a plurality of points;
   identify, among the plurality of points, a first set of points for which energy returned to the LIDAR detector exceeds a predetermined energy threshold, wherein the first set of points is reflected from an object;
   identify, among the plurality of points, a second set of points adjacent to the first set of points, wherein the second set of points has an associated range that differs from a range of the first set of points by less than a predetermined range threshold;
   define, as a border, an outline of the second set of points;
   iteratively reduce laser power associated with the first set of points, acquire a new frame, identify the second set of points in the new frame, and define, as the border, the outline of the second set of points in the new frame to cause the border to converge to a stable size; and
   output an estimated size of the object based, at least in part, on the stable size of the border.

9. The non-transitory computer-readable medium of claim 8, wherein the instructions include further instructions that when executed by one or more processors cause the one or more processors to identify, for a data fusion module of a vehicle, the first set of points as having low confidence.

10. The non-transitory computer-readable medium of claim 8, wherein the instructions include further instructions that when executed by one or more processors cause the one or more processors, after the border has converged to the stable size, to identify, for a data fusion module of a vehicle, a set of laser beams corresponding to the first set of points as having a reduced range.

11. The non-transitory computer-readable medium of claim 8, wherein the LIDAR detector is integrated with a vehicle.

12. The non-transitory computer-readable medium of claim 11, wherein the vehicle is an autonomous vehicle.

13. The non-transitory computer-readable medium of claim 8, wherein the second set of points includes one or more fringe points lying outside of an outline of the object.

14. A method of reducing Light Detection and Ranging (LIDAR) target broadening, the method comprising:
   acquiring, at a LIDAR detector, a frame including a plurality of points;
   identifying, among the plurality of points, a first set of points for which energy returned to the LIDAR detector exceeds a predetermined energy threshold, wherein the first set of points is reflected from an object;

identifying, among the plurality of points, a second set of points adjacent to the first set of points, wherein the second set of points has an associated range that differs from a range of the first set of points by less than a predetermined range threshold;

defining, as a border, an outline of the second set of points;

iteratively reducing laser power associated with the first set of points, acquiring a new frame, identifying the second set of points in the new frame, and defining as the border, the outline of the second set of points in the new frame to cause the border to converge to a stable size; and outputting an estimated size of the object based, at least in part, on the stable size of the border.

15. The method of claim 14, further comprising identifying, for a data fusion module of a vehicle, the first set of points as having low confidence.

16. The method of claim 14, further comprising, after the border has converged to the stable size, identifying, for a data fusion module of a vehicle, a set of laser beams corresponding to the first set of points as having a reduced range.

17. The method of claim 14, wherein the LIDAR detector is integrated with a vehicle.

18. The method of claim 17, wherein the vehicle is an autonomous vehicle.

19. The method of claim 14, wherein the energy returned to the LIDAR detector corresponds to saturation for at least one point in the first set of points.

20. The method of claim 14, wherein the second set of points includes one or more fringe points lying outside of an outline of the object.

* * * * *